Nov. 4, 1958
H. GERSTEIN ET AL
2,858,887
BIAS CUTTING MACHINES
Filed Dec. 16, 1955
3 Sheets-Sheet 1
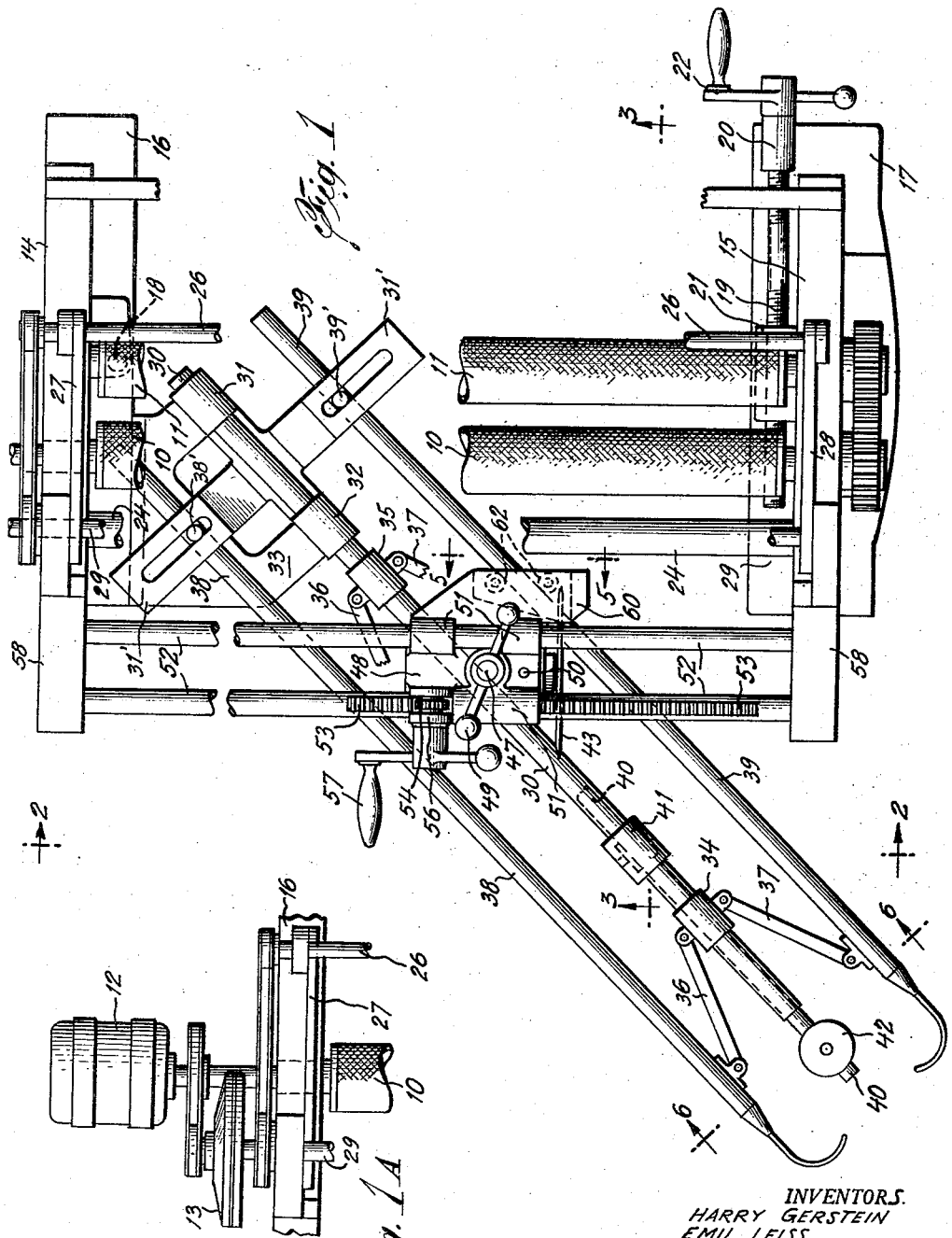
INVENTORS.
HARRY GERSTEIN
EMIL LEISS
BY CARL BAYER
Robert J. Hulsizer
ATTORNEY Nov. 4, 1958
H. GERSTEIN ET AL
2,858,887
BIAS CUTTING MACHINES
Filed Dec. 16, 1955
3 Sheets-Sheet 2
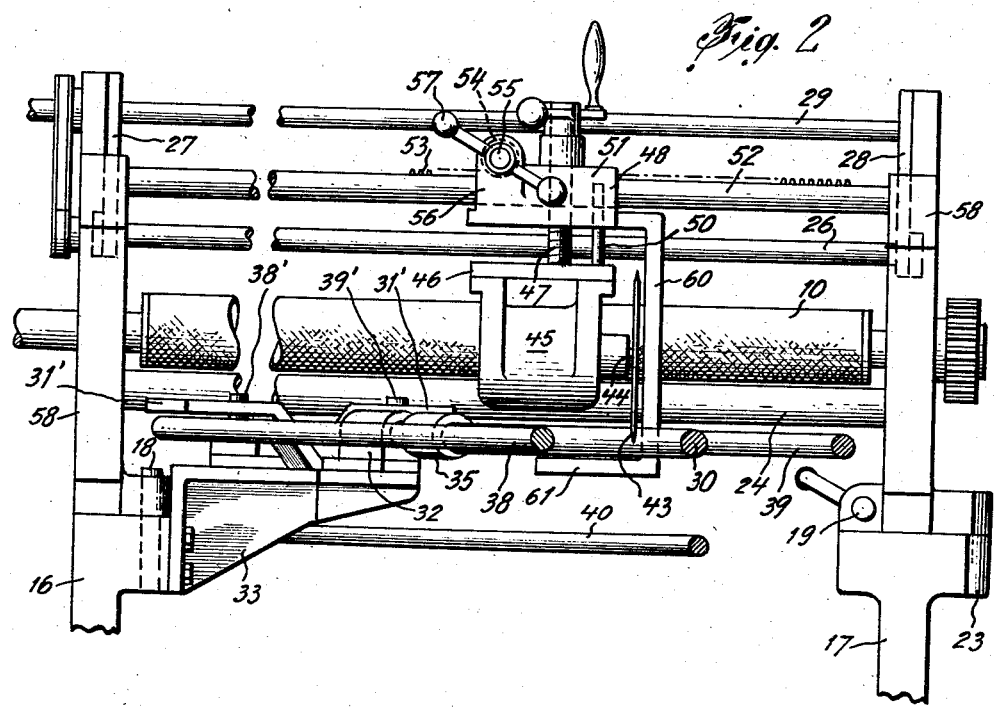
INVENTORS.
HARRY GERSTEIN
EMIL LEISS
CARL BAYER
BY
Robert I. Hulsizer.
ATTORNEY Nov. 4, 1958
H. GERSTEIN ET AL
2,858,887
BIAS CUTTING MACHINES
Filed Dec. 16, 1955
3 Sheets-Sheet 3
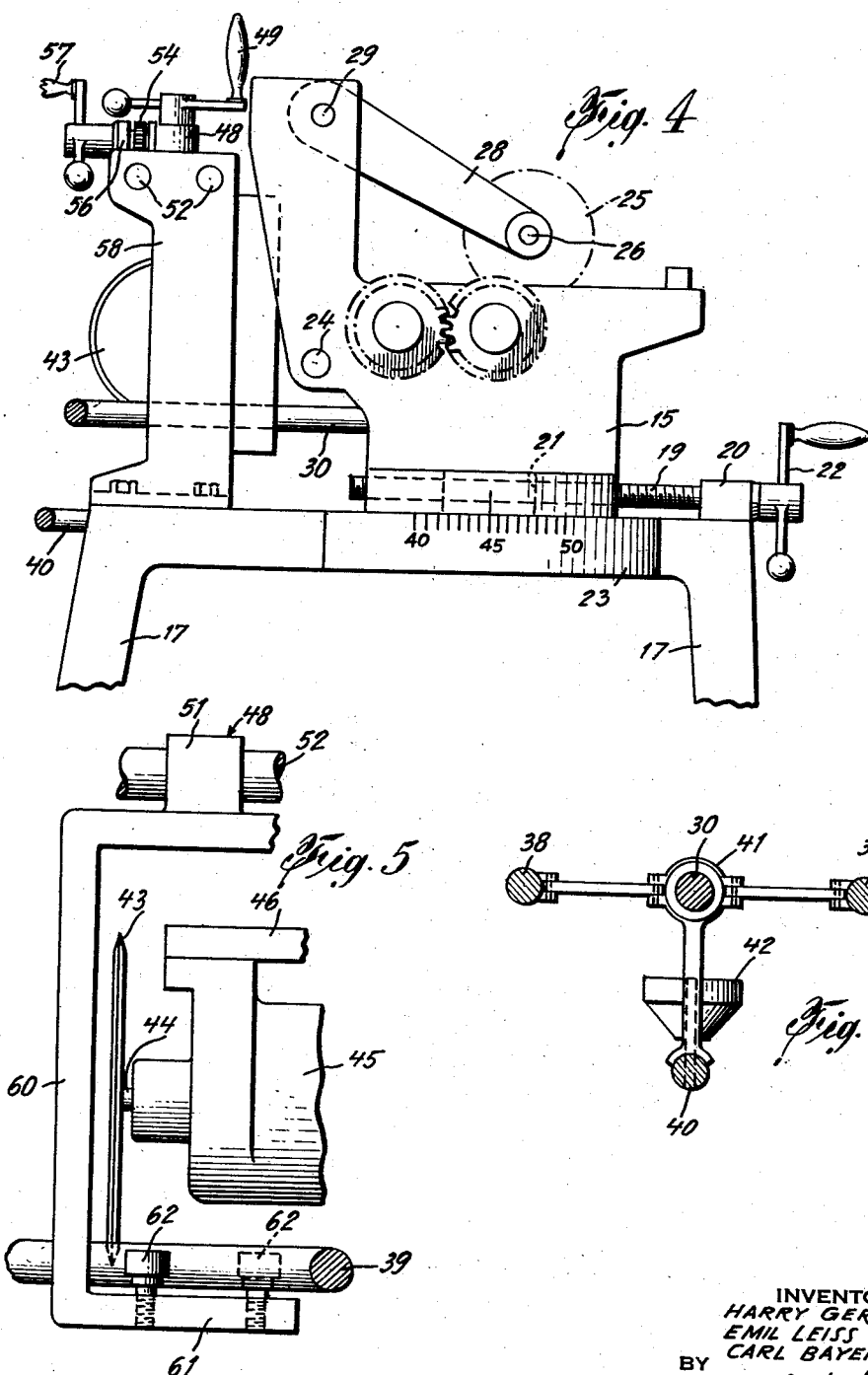
INVENTORS.
HARRY GERSTEIN
EMIL LEISS
CARL BAYER
BY
ATTORNEY

United States Patent Office 2,858,887
Patented Nov. 4, 1958

2,858,887

BIAS CUTTING MACHINES

Harry Gerstein, Roslyn Heights, N. Y., and Emil Leiss, Ridgewood, and Carl Bayer, Paramus, N. J., assignors to Lever Bias Machine Corporation, New York, N. Y., a corporation of New York Application December 16, 1955, Serial No. 553,654

12 Claims. (Cl. 164—61)

This invention relates to new and useful improvements in bias cutting machines and has particular reference to automatic control of the mandrel from the changes in position of the cutting knife and vice versa.

In former machines of this general type, there was generally a set of wind-up rollers disposed in a given line and a mandrel disposed at an angle to the line of the rollers. When tubular material is passed on to the mandrel to be cut on the bias, it is necessary manually to adjust the mandrel bars with respect to each other in accordance with the diameter of the tube. It is also necessary to adjust the position of the cutting knife which is generally moved in a line more or less parallel to the line of the rollers. This is done in accordance with the desired width of the bias strip to be cut.

It is the main object of this invention to provide a means cooperatively associated between the knife unit and the mandrel unit so that as one unit is moved in one or the other direction the other is correspondingly moved without requiring them to be separately adjusted.

Further and more specific objects, features, and advantages will more clearly appear from a consideration of the specification hereinafter set forth especially when taken in connection with the accompanying drawings which illustrate a present preferred form which the invention may assume.

In brief and general terms the invention includes the combination of a mandrel having bars to be adjusted to the size of the tube passing thereover, a cutting means, such as a knife, mounted on a support and movable in a line at an angle to the mandrel bars, and means cooperatively associated between the knife unit and the mandrel bars to expand or contract the mandrel bars as the knife unit is moved in one or the other direction.

More particularly, the invention includes a wind-up unit having rollers and adjustably angularly around a pivot point; a knife unit including a frame supported from the floor or from the wind-up unit and along which the knife may be moved, said knife being movable only along the supporting frame in a line somewhat paralel to the wind-up rollers; a mandrel of a plurality of parallel bars adapted to be contracted or expanded in accordance with the size of the tube to be passed thereover and disposed at an angle to the knife-supporting frame; and means on the movable knife unit and cooperating with the mandrel bars to expand or contract the same as the knife is moved one way or the other.

A further feature comprises handle means for lifting or lowering the knife with respect to the mandrel and for moving the knife unit along its supporting frame.

The present preferred form which the invention may assume is illustrated in the drawings, of which, Fig. 1 is a plan view of the apparatus with portions broken away;

Fig. 1A is a continuation of the upper end of Fig. 1 showing the drive-motor connections for the wind-up device;

Fig. 2 is a vertical section taken on the line 2—2 of Fig. 1;

Fig. 3 is a vertical section taken on the line 3—3 of Fig. 1;

Fig. 4 is a side elevation taken from the right side of Fig. 2;

Fig. 5 is a vertical section taken on the line 5—5 of Fig. 1; and,

Fig. 6 is a vertical section taken on the line 6—6 of Fig. 1.

Referring to the specific form of the invention shown in the drawings, it will be seen that there are wind-up rollers 10 and 11 driven through suitable gears and belts from a motor 12 between which and the rollers there is a slip clutch 13. These rollers are journalled between the plates 14 and 15 which are mounted on pedestal legs or supports 16 and 17 fixed to the floor. The end plate 14 is pivoted to the pedestal 16 at 18 and the end plate 15 is slidable along its pedestal 17 to adjust the rollers angularly around the axis of the pivot 18. The adjustment of the rollers in this manner is achieved by means of a rotatable screw threaded shaft 19 journalled in a lug 20 on the pedestal 17 and passing through an interiorly threaded bushing 21 on the end plate 15 and turnable by a handle 22. An angle gauge plate 23 is disposed on the upper outer surface of the pedestal 17 to indicate the degree of angularity.

The material being cut is passed from a mandrel, later described, under a fixed bar 24 extending between the plates 14 and 15 and then over the driven roller 10 and under and around the roller 11, and then is wound up in a roll 25 on a shaft 26 which is driven by suitable belts and pulleys from the motor 12. This roll is supported on pivoted side arms 27 and 28 which are pivoted on shaft 29 which in turn is journalled in the end plates 14 and 15. The roll 25 rests by gravity on the roller 11 to maintain suitable frictional pull on the material.

A main feature of the invention has to do with the operation of the mandrel over which the material is fed to be cut and passed on to the wind-up mechanism above described. The mandrel comprises a rigid supporting stationary bar 30 which is supported at one end by spaced sleeves 31 and 32 disposed on a bracket plate 33 fixed to the pedestal member 16 as shown in Fig. 2. Slidable on this bar 30 are two sleeves 34 and 35 at spaced points thereon. To opposite sides of these sleeves 34 and 35 are pivotally connected arms 36 and 37, the other ends of which are pivotally connected at spaced points to horizontally spaced mandrel rods 38 and 39. A third mandrel rod 40 is disposed below and medially parallel to the rods 38 and 39 and is pivoted to sleeves such as 41, of which one is shown in Fig. 1 and counterweighted by a weight 42 somewhat in the manner shown in U. S. Patent No. 2,291,707 issued August 4, 1942. Mounted on the bracket plate 33 are oppositely extending slotted arms 31' in which slots ride pins 38' and 39' respectively projecting up from mandrel bars 38 and 39. This construction permits the mandrel bars to move laterally only.

The means for cutting the material on the bias as it leaves the mandrel and passes on to the wind-up rolls, comprises a rotatable knife 43 on shaft 44 driven by a motor enclosed within casing 45. The casing 45 is supported from a plate 46 to which the lower end of a threaded screw shaft 47 is connected. This shaft 47 extends upwardly and passes through a threaded bore in a block 48 and on its upper end has a handle 49 to turn the shaft 47 and permit the motor casing to be raised or lowered as may be desired. A pin 50 on the plate 46 extends upwardly and passes through a slot in the block 48 to prevent the motor casing from turning as the block 48 is moved in a direction parallel to the axis of the knife shaft or as the motor casing is raised or lowered. As the knife tends to wear away it may be lowered to maintain its proper cutting position with respect to the material passing over the mandrel.

The block 48 is provided with two bored sleeves 51 through which pass rods 52. One of these rods has teeth 53 on its upper surface which are engaged by teeth on a gear 54 on shaft 55 mounted in a bushing 56 on the block 48 and this shaft is turned by a handle 57 which will cause the block to be moved along the rods 52. By these mechanisms the knife can be lowered or raised and can be moved along across the face of the wind-up device. The rods 52 are supported at their ends in supporting plates which, as shown in Fig. 1, are supported by pedestal members 58 to the upper surface of the wind-up unit, whereas in Fig. 4 they are shown as mounted directly on the pedestal lugs 16 and 17. These are alternate forms for mounting the rods and their associated elements.

As shown particularly in Figs. 2 and 5, the block 48 has attached thereto a U-shaped plate 60 on which at its upper end is fastened to the block in any suitable manner and on its lower leg 61 has a pair of spaced upright adjustable studs or rollers 62 which are adapted to lie closely adjacent to and on opposite side of one of the upper mandrel bars such as 39. It is apparent that as the knife is moved along its support in one or another direction the mandrel bars will be caused to move inwardly or outwardly to adjust the size of the mandrel to the particular goods being employed.

In the operation of the device, with a definite width of bias strip to be cut, a tubular material of the proper diameter is made and passed on to the mandrel, beneath the knife, cut, and passed on to the wind-up device sufficiently far to be gripped by the rollers thereon. The angle of the wind-up device has been adjusted to be at right angles to the strip being cut. The relation between the knife, the mandrel bars is so designed and arranged that as the knife cuts the tubular material into a bias strip, the strip will be centrally located on the rollers, and this relation exists and continues regardless of the movement of the knife and the mandrel bars. After this adjustment is made, the motor is started and the material is then continuously passed over the mandrel, cut by the knife, and then wound up on the wind-up device. As the knife is worn slightly away the knife can be lowered by the adjustment mechanism associated therewith and above described or it can be raised for any desired reason. By reason of the gravity-tensioned lower mandrel bar the material is kept under constant proper tension. It is obvious that many other types of mandrels may be employed having movable bars, or movable boards, and the like. The gist of the invention is the simultaneous movement of the knife and the mandrel so that the mandrel can be accommodated for all diameters of tubular material and the knife is properly adjusted at the same time to cut the material along lines resulting in the central disposition of the goods on the mandrel.

What we claim as our invention is:

1. In a machine of the class described having an expandable mandrel whose size is adjusted by movement of at least one of its members, a knife support adjacent the mandrel and movable in angular relation thereto, a cutting knife on said support extending towards the mandrel, the invention which comprises means associated with said mandrel member and the knife support for simultaneously moving them whereupon the position of the knife support and the mandrel size are simultaneously adjusted.

2. A machine as defined in claim 1, including a wind-up device adapted to receive material cut by the knife.

3. A machine as defined in claim 2, wherein the wind-up device includes wind-up rollers so positioned that the knife support when moved, travels along said rollers.

4. A machine as defined in claim 1, wherein said movable mandrel member is along the mandrel and including a second mandrel member along the mandrel and means associated with both said mandrel members to move them towards and away from each other depending upon the direction of movement of one of them.

5. In a machine of the class described, material wind-up rollers, a material-cutting knife disposed adjacent said rollers, means for moving the knife along a line substantially parallel to the rollers, expandable mandrel bars disposed at an angle to the wind-up rollers, and means associated with the knife and with the mandrel bars to expand and contract the mandrel bars with respect to each other as the knife is moved in one direction or another.

6. In a machine of the class described, a material-cutting knife, a support for said knife adapted to be moved in either direction along a predetermined line, a mandrel bar disposed at an angle with respect to the line of movement of the knife support, and means on the knife support and associated with the bar to displace the bar laterally of its length in one direction or another as the knife support is moved in one or the other direction.

7. In a machine of the class described, a material-cutting knife support, means for moving it along a given line, an expandable and contractible mandrel comprising bars disposed at an angle to said line, and means associated with the knife support and associated with the mandrel bars to expand or contract said mandrel as the knife support is moved in one direction or another.

8. In a machine of the class described, wind-up rollers, a support for the rollers pivoted around a predetermined axis, means for adjusting the support at desired angles, a mandrel comprising bars disposed at an angle to the rollers, a support for said bars, means for connecting said bars to their support to permit them to be moved farther apart or closer together, a knife for cutting material, a support for said knife, said knife support movable along a given line at an angle to the mandrel bars, and means associated between the knife support and the mandrel bars to expand and contract the mandrel laterally as the knife support is moved.

9. In a machine of the class described having a mandrel with a plurality of movable bars, a cutting knife, and wind-up rollers, the invention which comprises a support for the knife along which the knife may be moved, said support being substantially parallel to the rollers and at an angle to the mandrel bars, a casing on which the knife is supported, said casing being movable along said support, a pair of projections on said casing, disposed closely adjacent opposite sides of one of the mandrel bars to move said bar laterally when the casing is moved in one direction or the other.

10. In a machine of the class described having a mandrel with a plurality of movable bars, a cutting knife, and wind-up rollers, the invention which comprises a support for the knife along which the knife may be moved, said support being substantially parallel to the rollers and at an angle to the mandrel bars, a casing on which the knife is supported, said casing being movable along said support, a pair of projections on said casing, disposed closely adjacent opposite sides of one of the mandrel bars to move said bar laterally when the casing is moved in one direction or the other, manual means to move the knife casing along the support, and manual means to raise and lower the knife with respect to its casing.

11. In a machine of the class described having a mandrel with a plurality of movable bars, a cutting knife, and wind-up rollers, the invention which comprises a support for the knife along which the knife may be moved, said support being substantially parallel to the rollers and at an angle to the mandrel bars, a casing on which the knife is supported, said casing being movable along said support, a pair of projections on said casing, disposed closely adjacent opposite sides of one of the mandrel bars to move said bar laterally when the casing is moved in one direction or the other, the mandrel bar moved by the projections being so associated with other mandrel bars that when the first bar is laterally moved the others will move correspondingly.

12. In a machine of the class described having a mandrel with a plurality of movable bars, a cutting knife, and wind-up rollers, the invention which comprises a support for the knife along which the knife may be moved, said support being substantially parallel to the rollers and at an angle to the mandrel bars, a casing on which the knife is supported, said casing being movable along said support, a pair of projections on said casing, disposed closely adjacent opposite sides of one of the mandrel bars to move said bar laterally when the casing is moved in one direction or the other, manual means to move the knife casing along the support, and manual means to raise and lower the knife with respect to its casing, the mandrel bar moved by the projections being so associated with other mandrel bars that when the first bar is laterally moved to the others will move correspondingly.

References Cited in the file of this patent
UNITED STATES PATENTS 1,580,374   Dulbert _____ Apr. 13, 1926